United States Patent
Schuermann et al.

(10) Patent No.: US 8,415,584 B2
(45) Date of Patent: Apr. 9, 2013

(54) MODULAR LASER MACHINING SYSTEM WITH FUNCTIONAL MODULE

(75) Inventors: Bert Schuermann, Gernsbach (DE); Ludwig Weber, Gernsbach (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 758 days.

(21) Appl. No.: 12/555,547

(22) Filed: Sep. 8, 2009

(65) Prior Publication Data

US 2010/0072180 A1 Mar. 25, 2010

(30) Foreign Application Priority Data

Sep. 22, 2008 (DE) .......................... 10 2008 048 323

(51) Int. Cl.
*B23K 26/14* (2006.01)
(52) U.S. Cl. ............................. 219/121.67; 219/121.75
(58) Field of Classification Search ............. 219/121.63, 219/121.64, 121.65, 121.66, 121.67, 121.68, 219/121.69, 121.73, 121.74, 121.75, 121.76
See application file for complete search history.

(56) References Cited

U.S. PATENT DOCUMENTS

| 6,822,187 B1 * | 11/2004 | Hermann et al. | 219/121.63 |
| 2009/0084765 A1 * | 4/2009 | Muratsubaki et al. | 219/121.67 |

FOREIGN PATENT DOCUMENTS

DE 202004013136 7/2005

* cited by examiner

*Primary Examiner* — Khiem D Nguyen
(74) *Attorney, Agent, or Firm* — Muncy, Geissler, Olds & Lowe, PLLC

(57) ABSTRACT

A description is given of a modular laser processing system (10) for processing a workpiece (20) by means of a processing laser beam (14), which system has a multiplicity of functional modules (100) with a beam passage region (102) which can be connected to one another in series along a processing laser beam path, comprising a functional module (100) embodied as a fiber connection module (104) and serving for accommodating a fiber end from which the processing laser beam (14) emerges, and a functional module (100) embodied as a collimator module (106) and having a collimator lens (16a, 16b, 16c), which collimates the processing laser beam (14), wherein the collimator lens (16a, 16b, 16c) is selected from a group of collimator lenses having different focal lengths which correspond to a raster dimension ($L_1$) or to an integer multiple thereof, characterized in that the length (A) of the beam passage region (102) of a functional module (100) along the processing laser beam path corresponds to the raster dimension ($L_1$) or to an integer multiple thereof.

11 Claims, 9 Drawing Sheets

MODULAR LASER MACHINING SYSTEM WITH FUNCTIONAL MODULE

Figure 1:
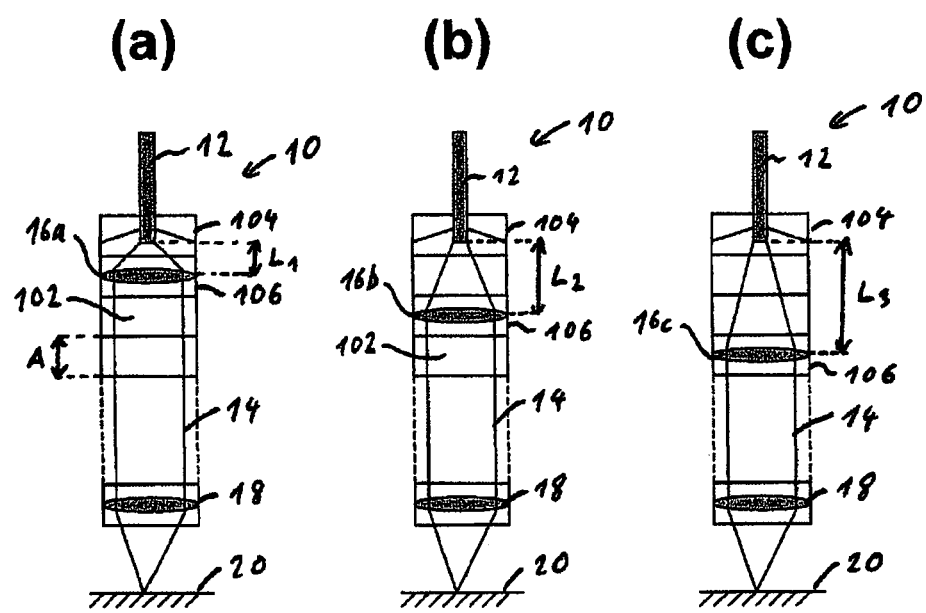

The invention relates to a modular laser processing system for processing a workpiece by means of a processing laser beam, and to a functional module for the construction of said system.

Modular laser processing systems in which a laser processing head is constructed from a multiplicity of functional modules are already known. In this case, a functional module fulfills a specific task at a corresponding position in the beam path of the processing laser beam, wherein the beam entrance side and the beam exit side of a functional module are configured in such a way that they can be coupled to further functional modules in order thus to obtain a modular kit system for the construction of a laser processing head. In this case, customary functions of a known functional module are accommodating an optical fibre, mounting a collimator lens protective glass, accommodating a collimator lens, adjusting corresponding functional modules in an x or y direction, that is to say adjustment in a plane perpendicular to the laser processing beam path, coupling out a processing laser beam for laser power measurement, accommodating a focusing lens, accommodating a protective glass for protecting the focusing lens and, if appropriate, providing a crossjet module for screening the laser processing head by means of a transversely flowing protective gas.

What is common to the known optical module kit systems for the construction of a laser processing head, however, is that although the functional modules can in each case be coupled to one another at their beam exit and beam entrance sides, they all have different external dimensions.

Thus, at locations of the laser processing head in which the laser processing beam is not collimated, a functional module cannot simply be inserted or exchanged on account of the corresponding focal lengths of the lens modules used.

DE 20 2004 013 136 U1 describes a modular light wave optical arrangement, in particular a modular laser beam processing system for the laser beam processing of workpieces, which has a multiplicity of functional modules which can be connected to one another in series along a processing beam path. In this case, a functional module embodied as a fibre connection module and serving for accommodating the end of an optical fibre is provided. In addition, the laser processing system comprises an optical module that can be equipped with collimator lenses having different focal lengths.

The invention is based on the object of providing a modular laser processing system and a functional module in which adaptation of the laser processing system in the case of different focal lengths of a collimator lens is simplified.

This object is achieved by means of the modular laser processing system according to claim 1 and by means of the functional module according to claim 13. Advantageous configurations and developments of the invention are set out in the dependent claims.

The invention provides a modular laser processing system for processing a workpiece by means of a processing laser beam, which system has a multiplicity of functional modules with a beam passage region which can be connected to one another in series along a processing laser beam path, comprising a functional module embodied as a fibre connection module and serving for accommodating a fibre end from which the processing laser beam emerges, and a functional module embodied as a collimator module and having a collimator lens, which collimates the processing laser beam, wherein the collimator lens is selected from a group of collimator lenses having different focal lengths which correspond to a raster dimension or to an integer multiple thereof, wherein the length of the beam passage region of a functional module along the processing laser beam path corresponds to the raster dimension or to an integer multiple thereof.

Therefore, a modular laser processing system is provided which is constructed from a multiplicity of modules, wherein one module is provided for holding a fibre for coupling out a laser processing beam and another module is provided for holding a collimator lens, and wherein the focal lengths of the collimator lenses used are rastered, that is to say have a multiple of a raster dimension. In this case, the modules are adapted to the respective focal lengths on account of the raster dimension used such that, in the event of a change from a collimator lens having one focal length to a collimator lens having a next higher focal length, one or more modules can be inserted between the fibre holding module and collimator module, and the corresponding distance between the fibre end and the newly inserted collimator lens having the next higher focal length is thus created apart from a small readjustment.

For a compact configuration of the modules it is advantageous if the raster dimension lies in a range of between 20 mm and 35 mm, and for a simple calculation of the integer multiple of the raster dimension it is expedient if the raster dimension is 25 mm, in particular.

For diverse usability of the modular laser processing system it is advantageous if the multiplicity of functional modules comprises a basic module having a mount suitable for accommodating a collimator lens, a focusing lens, a beam trap, a protective glass, an optical filter or an aperture diaphragm.

In order to achieve an adjustment in the laser beam direction for the corresponding focusing or collimation of the laser processing beam in the modular laser processing system, it is advantageous if the multiplicity of functional modules comprises a z adjustment module, which has a mount adjustable in the z direction and suitable for accommodating a fibre bush, a collimator lens or a focusing lens.

Furthermore, it is expedient if, for a corresponding adjustment in a plane perpendicular to the laser beam direction of the corresponding functional modules, the multiplicity of functional modules comprises an x or y adjustment module, by means of which functional modules arranged beam-upstream with respect to the adjustment module can be adjusted in an x or y direction relative to functional modules arranged beam-downstream with respect to the adjustment module.

In this case, it is expedient if the x or y adjustment module has in its beam-entrance-side or beam-exit-side part a mount suitable for accommodating a fibre bush, a collimator lens or a focusing lens.

When a processing gas that is passed through the laser processing beam path is used, it is advantageous if the multiplicity of functional modules comprises a gas feed module, which has a connection for a processing gas that can be supplied to the beam passage region of the gas feed module.

In order to achieve an optimum cooling of the modular laser processing system, in which the functional modules are in a thermally coupled state on account of their material composition having good thermal conductivity, it is advantageous if the multiplicity of functional modules comprises a cooling module, which has an annular channel surrounding the beam passage region of the cooling module and suitable for passing through a cooling liquid for cooling the cooling module.

For deflecting the processing laser beam in the case of a correspondingly desired spatial structure of the laser processing system or for coupling out the laser processing beam for measuring the laser intensity, it is expedient if the multiplicity of functional modules comprises a beam deflection module, which has a semitransparent deflection mirror for coupling out part of the processing laser beam or a specular deflection mirror for deflecting the processing laser beam. In this case, the length of the beam passage region is not necessarily equal to the raster dimension, but rather can correspond for example to double or triple the raster dimension.

In order to enable the individual functional modules to be mounted with one another in a simple manner, it is expedient if the multiplicity of functional modules each have a screw adapter at their beam entrance side, by means of which screw adapter a functional module can be connected to a further functional module at the beam exit side thereof.

To realize a tight gas channel along the processing laser beam path for passing through a protective gas or processing gas, it is advantageous if the multiplicity of functional modules each have, either at their beam entrance side or at their beam exit side, a sealing element surrounding an opening region of the beam passage region in order to form a gastight passage channel of the multiplicity of functional modules in the interconnected state.

The invention furthermore provides a functional module with a beam passage region for the construction of a modular laser processing system for processing a workpiece by means of a processing laser beam by series connection to further functional modules which can be connected to one another in series along a processing laser beam path, wherein the modular laser processing system comprises a functional module embodied as a fibre connection module and serving for accommodating a fibre end from which the processing laser beam emerges, and a functional module embodied as a collimator module and having a collimator lens, which collimates the processing laser beam, and wherein the collimator lens is selected from a group of collimator lenses having different focal lengths which correspond to a raster dimension or to an integer multiple thereof. In this case, according to the invention, the length of the beam passage region of the functional module along the processing laser beam path corresponds to the raster dimension or to an integer multiple thereof.

Figure 2A:
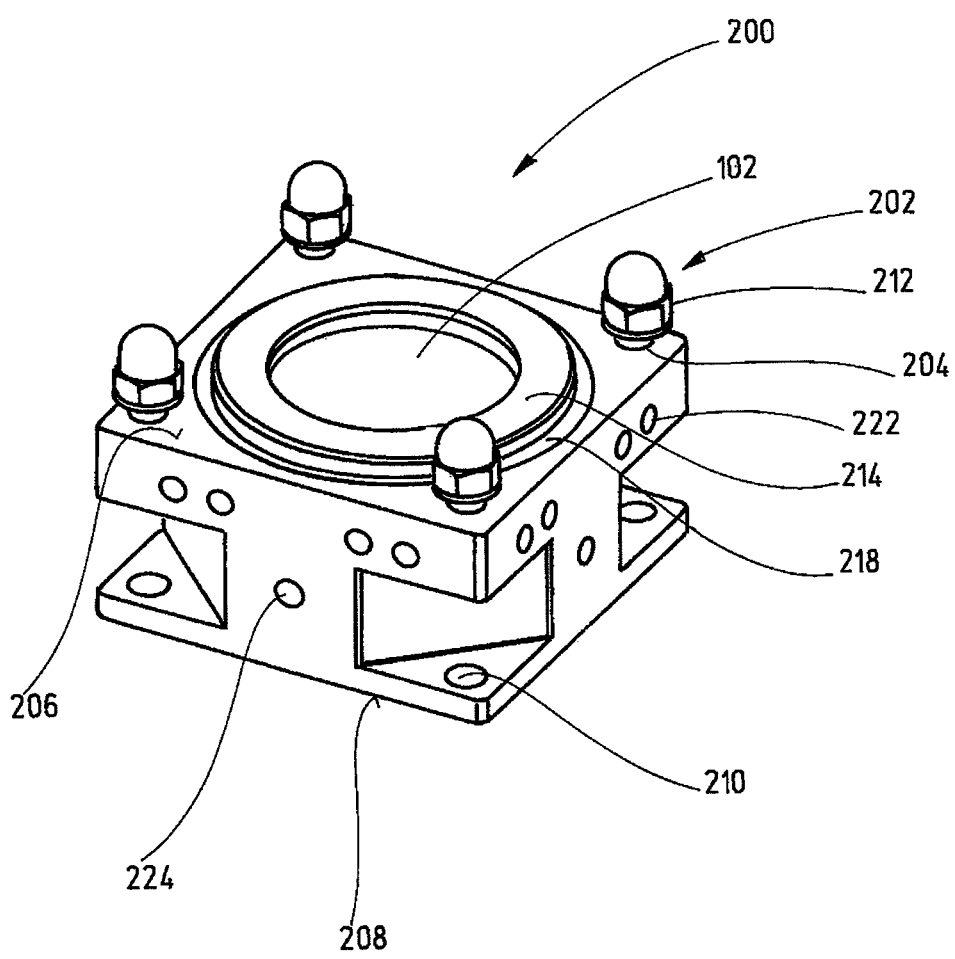
Figure 2B:
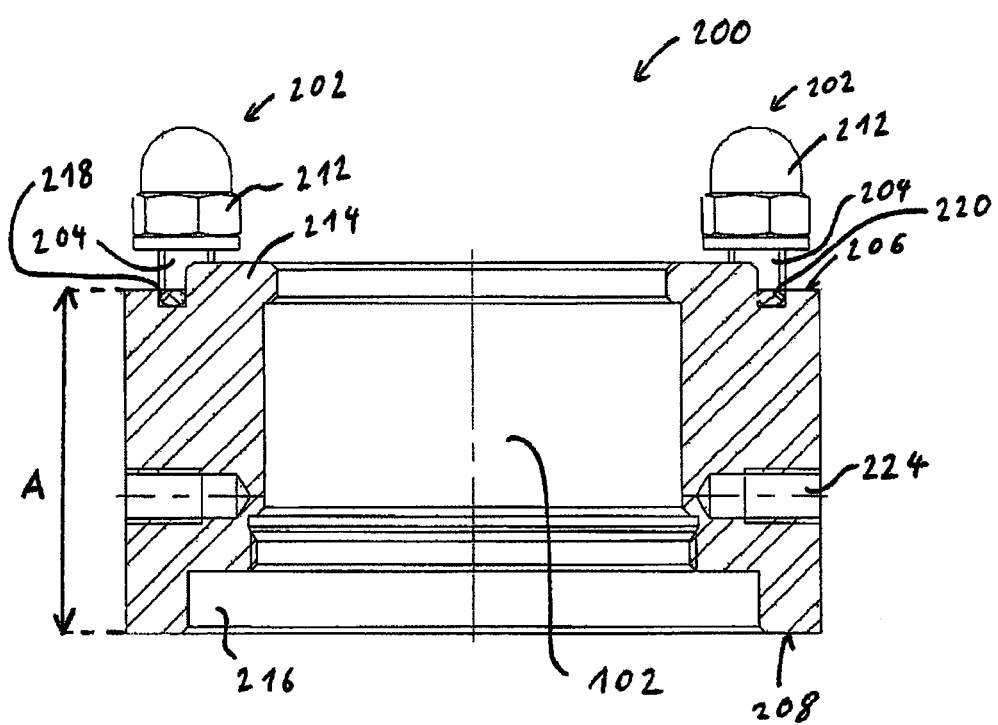
Figure 2C:
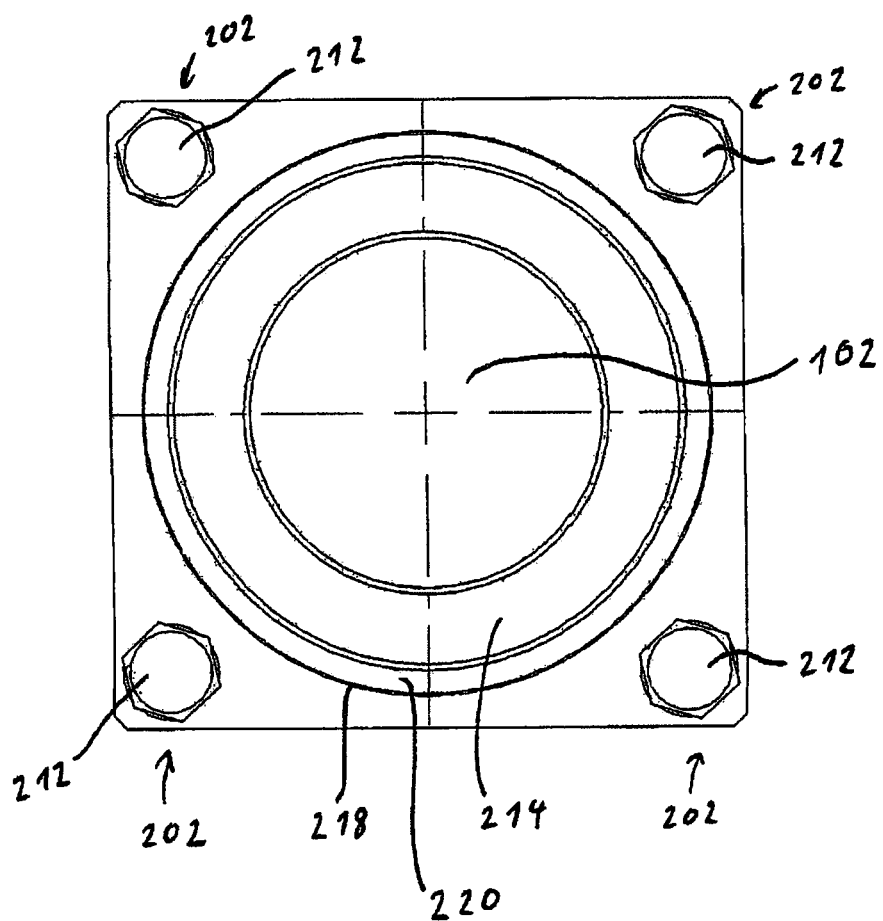
Figure 3:
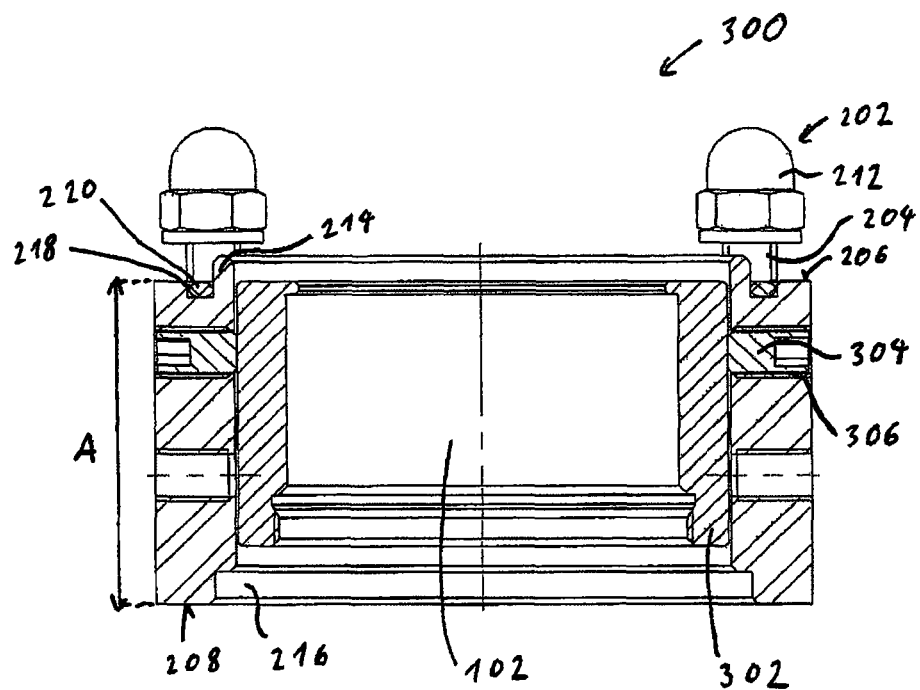
Figure 4:
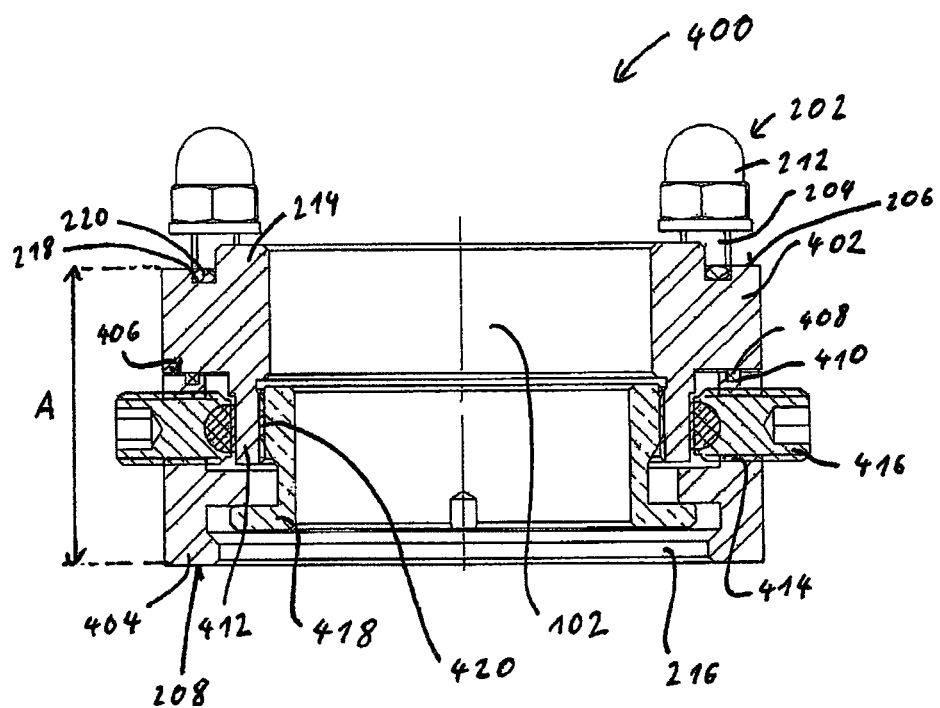
Figure 5:
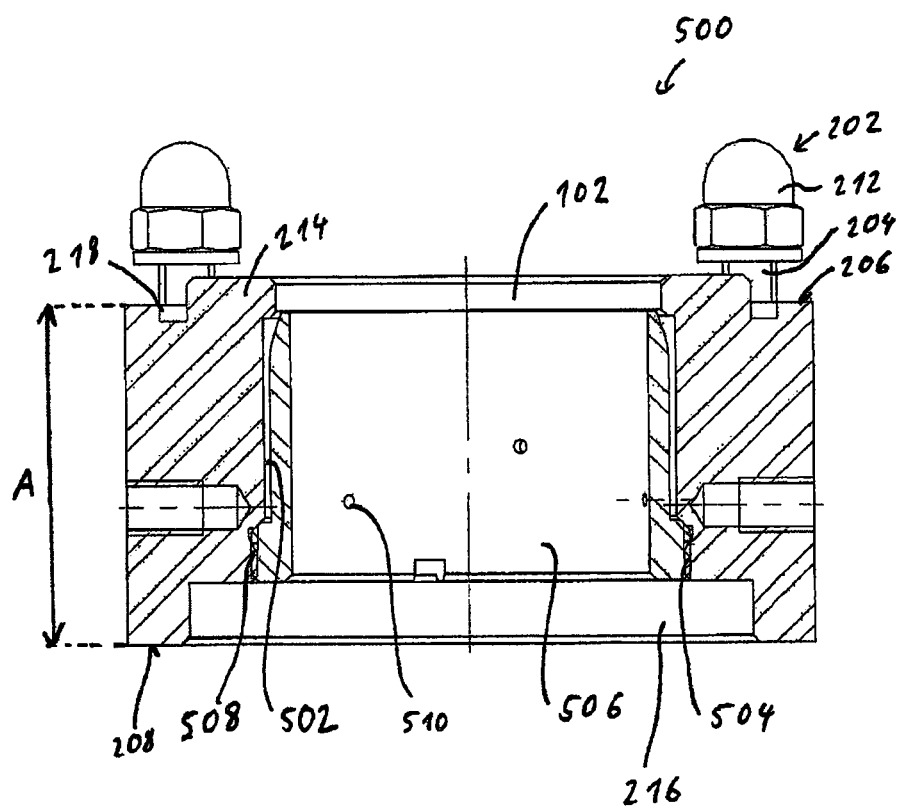
Figure 6:
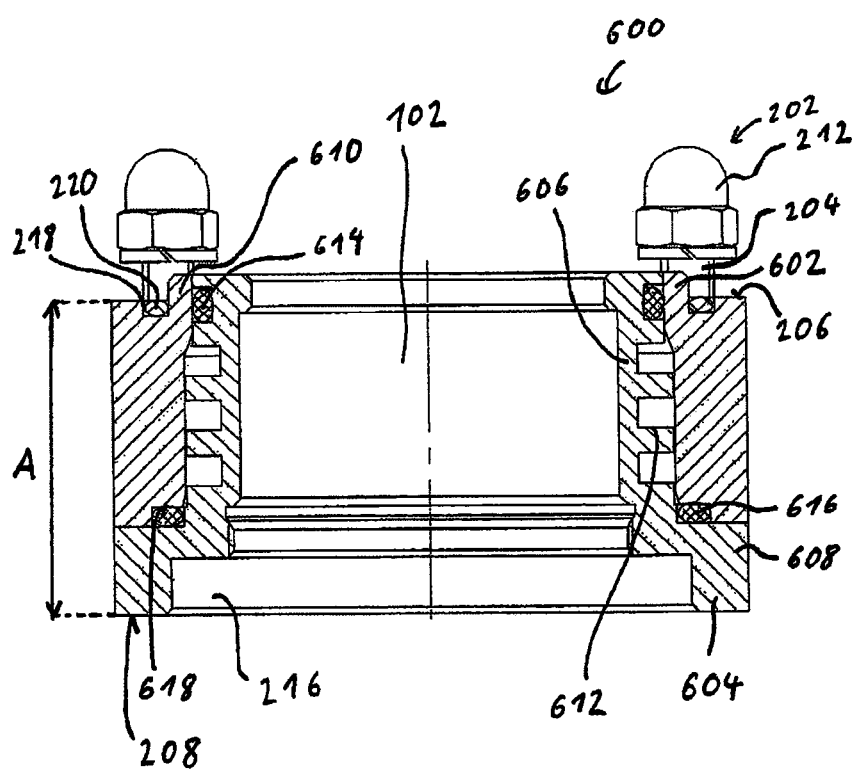
Figure 7:
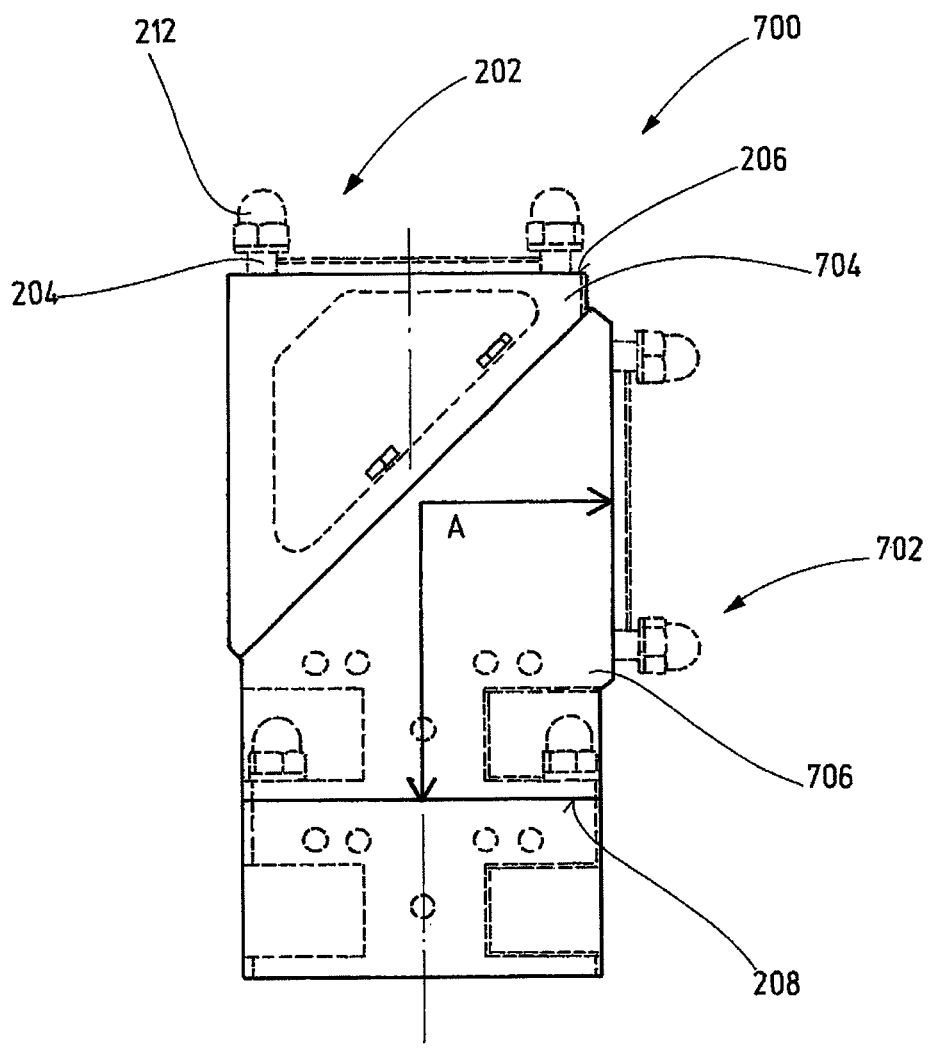

The invention is explained in more detail below by way of example with reference to the drawings, in which:

FIGS. 1A-1C show a highly simplified schematic view of three modular laser processing systems according to the invention which use collimator lenses having different focal lengths, FIG. 2A shows a schematic perspective view of a basic module according to the invention, FIG. 2B shows a schematic sectional view of a basic module according to the invention, FIG. 2C shows a schematic plan view of a basic module according to the invention, FIG. 3 shows a schematic sectional view of a z adjustment module according to the invention, FIG. 4 shows a schematic sectional view of an x or y adjustment module according to the invention, FIG. 5 shows a schematic sectional view of a gas feed module according to the invention, FIG. 6 shows a schematic sectional view of a cooling module according to the invention, and FIG. 7 shows a schematic side view of a beam deflection module according to the invention.

In the various figures of the drawings, mutually corresponding components are provided with identical reference symbols.

FIGS. 1(a), (b) and (c) show highly simplified schematic views of three different modular laser processing systems 10 according to the invention, such as are used with laser processing machines or apparatuses. In this case, a processing laser beam 14 conducted through a fibre 12 by the laser processing machine is coupled out from the fibre 12, collimated by a corresponding collimator lens 16a, 16b, 16c having different focal lengths and focused onto a workpiece 20 by an optic 18 in order to process the workpiece 20 using the processing laser beam 14, wherein welding or cutting work can be carried out, by way of example.

In this case, the modular laser processing system 10 is constructed from a multiplicity of functional modules 100 which can be connected to one another by a uniform coupling system, which will be described in detail below. In this case, the functional module 100 has a beam passage region 102, through which the laser processing beam 14 is passed. In this case, the length of the passage region along the laser processing beam 14 is equal to a length A. In this case, the length A does not have to coincide with the actual height of a functional module 100 used, but rather corresponds to the length which a corresponding functional module 100 contributes to the construction of the overall beam path. Therefore, in the case of a beam deflection module (as shown in FIG. 7), the length A can correspond to the length covered by the processing laser beam 14 when passing through the corresponding module.

The fibre 12 is held within a fibre connection module 104, wherein the fibre end of the fibre 12 is depicted centrally with regard to the height of the fibre connection module 104. The processing laser beam 14 coupled out from the fibre end of the fibre 12 is collimated by the respective collimator lens 16a, 16b, 16c in a collimator module 106, wherein the collimator lens 16a, 16b, 16c is likewise depicted schematically as being central with regard to the height of the collimator module 106. This arrangement of the respective optical components is purely schematic, however, since what is important for the realization of the invention is not the arrangement of the optical component within a functional module itself, but rather only the arrangement of the respective optical components at an identical location in the beam direction within the functional modules used, whereby a basic distance between the fibre end of the fibre 12 and the collimator lens 16a, 16b, 16c equal to a length A is achieved.

In the example shown in FIG. 1(a), the focal length of the collimator lens 16a is equal to a raster dimension $L_1$ and equal to the length A. However, the raster dimension does not have to be equal to the smallest focal length used in the collimator lens system, and so for example the collimator lens having the smallest focal length can correspond to equal to triple the raster dimension. A precise adaptation and focusing in accordance with the focal length used takes place by means of an adjustment in the beam direction, as will be described in further detail later.

It is an aim of the invention, then, to achieve simple conversion of the modular laser processing system 10 when different focal lengths of the collimator lenses 16a, 16b, 16c are used. For this purpose, collimator lenses 16a, 16b, 16c are used, the focal length of which is rastered, that is to say which are an integer multiple of the raster dimension $L_1$. In the event of a change from a collimator lens 16a having the focal length which, by way of example, is equal to the raster dimension $L_1$ (FIG. 1(a)) to a collimator lens 16b having a second focal length $L_2$, which corresponds to double the raster dimension $L_1$, as shown in FIG. 1(b), a functional module 100 can therefore be simply inserted between the collimator module 106 and the fibre connection module 104 since the length A of a beam passage region of a functional module 100 corresponds to the raster dimension $L_1$. In this case, it should be pointed out that a functional module 100 need not necessarily have a length A equal to the raster dimension $L_1$; it is also conceivable, for example, that specific modules such as, for example, a beam deflection module can have a length A with regard to their beam passage region which corresponds to a multiple of the raster dimension $L_1$.

As shown in FIGS. 1(a) to 1(c), therefore, through the use of the rastered focal lengths of the collimator lenses 16a, 16b and 16c equal to the lengths $L_1$, $L_2=2L_1$ and $L_3=3L_1$, the modular laser processing system 10 can be converted in a simple manner by the incorporation of functional modules 100 having a length A which corresponds to the raster dimension $L_1$ in the present example. This affords the particular advantage that functional modules 100 which were mounted beam-downstream with the use of the raster dimension $L_1$ for the focal length of the collimator lens 16a (FIG. 1(a)), when a collimator lens 16b having a focal length with the length $L_2$ is used, can now be simply arranged between the fibre connection module 104 and the collimator module 106, whereby the total height of the modular laser processing system 10 is not altered and, consequently, a compact design of the laser processing system is achieved.

Various configurations of a functional module 100 from FIG. 1 will now be explained in detail below.

A functional module 100 configured as a basic module 200 is illustrated in FIG. 2A to FIG. 2C.

The basic module 200 has a screw adapter 202 on its top side, which is preferably the beam entrance side in a state connected to other functional modules, owing to the easier mounting. In the present exemplary embodiment of the basic module 200, the screw adapter 202 comprises four threaded pins 204 which extend away perpendicularly from an end surface 206 and are arranged at the respective corners of the basic module 200, which is shaped rectangularly in a plan view (FIG. 2C). The basic module 200 has holes 210 (only shown in FIG. 2A) at an end surface 208 on the underside, through which holes, for connecting the basic module 200 to a further functional module configured for example as a basic module 200, the threaded pins 204 can be inserted and fixed by means of cap nuts 212.

A ring-shaped projection 214 is furthermore provided on the surface 206 of the top side of the basic module 200, said projection surrounding the beam passage region 102 and fitting with regard to its dimensions into a cutout 216 in the underside of the basic module 200 in order thus to provide a plug connection between ring-shaped projection 214 and circular cutout 216 when a plurality of basic modules 200 are connected.

The ring-shaped projection 214 is surrounded by a ring-shaped groove 218 formed in the surface 206 of the top side of the basic module 200. A sealing ring 220 is inserted in the ring-shaped groove 218, said sealing ring being in contact upon connection of a basic module 200 to a further basic module 200 at the end surface 208 of the underside of the basic module 200 and thus sealing the beam passage region 102 of a multiplicity of functional modules from the surroundings.

As illustrated in FIG. 2A, the basic module 200 is embodied in parallelepipedal fashion, wherein the distance between the end surface 206 of the top side and the end surface 208 of the underside of the basic module 200 corresponds to the length A, which is preferably 25 mm. The width of the basic module 200 is preferably 50 mm.

Threaded holes 222 and fitting holes 224 are provided on the outer side of the basic module 200 in order to enable further parts to be mounted onto the outer side of the modular laser processing system, such as water cooling arrangements, for example, or in order to fix the modular laser processing system 10 to the laser processing machine.

The basic module 200 can have a mount in the beam passage region 102, the said mount being suitable for accommodating an optical component. Thus, by way of example, a collimator lens, a focusing lens, an optical filter, an aperture diaphragm or a protective glass can be fixed in the basic module 200, this being possible for example by means of an insert that can be screwed in (not shown). In this case, the corresponding lenses, glasses or filters are preferably embodied in circular fashion. However, it is also conceivable to arrange a mount for a beam trap or an aperture diaphragm in the basic module 200.

A functional module embodied as a z adjustment module 300 will be explained below, the schematic sectional view of said functional module being shown in FIG. 3. Only components that are different from those of the basic module 200 will be explained here.

The z adjustment module 300 has in its beam passage region 102 an insert 302, which is freely movable in the z direction or a direction parallel to the direction of the processing laser beam path and which can be fixed by locking screws 304 screwed into threaded holes 306.

The insert 302 can carry an optical component in this case, wherein the use of the z adjustment module 300 is particularly preferred for the mount of a collimator lens or of a fibre bush for mounting the fibre end of the fibre 12.

FIG. 4 shows an x or y adjustment module 400 in schematic sectional view. In this case, the x or y adjustment module 400 is provided for adjusting functional modules 100 which are arranged beam-upstream with respect to the adjustment module 400 in an x or y direction relative to functional modules 100 which are arranged beam-downstream with respect to the adjustment module 400. It is provided here according to the invention that the x or y adjustment module 400 is adjustable in each case only in a direction perpendicular to the direction of the processing laser beam path, wherein the mounting of a second adjustment module 400, the adjustment direction of which is perpendicular to the adjustment direction of an underlying adjustment module 400, makes it possible to achieve an adjustment in two directions in the plane perpendicular to the direction of the processing laser beam path.

The x or y adjustment module 400 has an upper or beam-entrance-side part 402 and a lower or beam-exit-side part 404, wherein the upper part 402 is mounted in a rail element 406, which extends perpendicular to the beam passage direction, on the lower part 404. In this case, the rail element 406 comprises an elongated projection element 408 in the upper part 402, which element runs in an elongated groove 410. In the exemplary embodiment shown in FIG. 4, the elongated projection element 408 and the elongated groove 410 are rectangular in section, but all possible forms are conceivable here; thus, a dovetail joint, for example, is also conceivable. The upper part 402 extends with a central part 412 into the lower part 404, wherein locking screws 416 arranged in threaded holes 414 in the lower part 404 lock the upper part 402 by contact with the central part 412 of the upper part 402. The central part 412 of the upper part 402 has a thread 416 on its ring-shaped inner side surrounding the beam passage region, into which thread an insert 418 with an outer thread 420 can be screwed. In this case, the insert 418 can be provided for accommodating a collimator lens, a focusing lens or a fibre bush for accommodating a fibre end of the fibre 12.

FIG. 5 shows a schematic sectional view of a functional module 100 configured as a gas feed module 500. The gas feed module 500 has an inner thread 504 in its inner wall 502 surrounding the beam passage region 102, into which inner thread a gas feed insert 506 with an outer thread 508 is screwed. The gas feed insert 506 is embodied in bush-type fashion, wherein feed nozzles 510 are formed in the wall of the gas feed insert 506, through which feed nozzles a processing gas or protective gas can be fed to the beam passage region 102. The gas fed in is in this case introduced into the space between the outer wall of the bush-type gas feed insert 506 and the inner wall 502 of the gas feed module 500 via a gas feed line (not shown) and then flows through the gas feed nozzles 510 into the beam passage region 102.

FIG. 6 shows a functional module 100 configured as a cooling module 600 in schematic sectional view.

The cooling module 600 has an upper or beam-entrance-side part 602 and a lower or beam-exit-side part 604, wherein the upper part 602 has a bush-type cutout and the lower part 604 has a bush-type section 606 and a base section 608. In this case, the lower part 604 is inserted by its bush-type section 606 into the interior of the bush-type cutout of the upper part 602, wherein the parallelepipedal base section 608 of the lower part 604 butts against an end side of the upper part 602. Like the basic module 200, the upper part 602 has a ring-shaped projection 610, wherein the end side of the ring-shaped projection 610 is aligned with the end side of the bush-type section 606 of the lower part 604 in the plugged-together state. The bush-type section 606 of the lower part 604 has in its outer wall a multiplicity of annular grooves 612 which, in the state inserted into the upper part 602, together with the inner wall of the upper part 602, form annular channels.

The bush-type section 606 of the lower part 604 has a sealing ring 614 on the side facing the ring-shaped projection 610 of the upper part 602, in order that the annular channels formed by the annular grooves 612 are sealed towards a top side of the cooling module 600. The annular channels are furthermore sealed in the direction of the lower part 604 by a sealing ring 616 arranged in an annular groove 618 situated in an end side of the upper part 602 facing the lower part 604, wherein, in the plugged-together state of the lower part 604 with the upper part 602, the sealing ring 616 seals the connection of the two parts 602 and 604. For the cooling of the cooling module 600, which is preferably produced from metal like the other functional modules 100 and thus ensures a good thermal contact with the overall system, use is preferably made of a cooling liquid such as water. The latter is fed by a feed channel (not shown) to the annular channel formed by the annular grooves 612. In this case, it is possible, for example, to form a plurality of annular channels or to provide a spiral annular channel, wherein in this case the water is fed in at one end and discharged at another end.

FIG. 7 shows a side view of a beam deflection module 700.

The beam deflection module 700 has, in addition to the screw adapter 202 already explained in the description of the basic module 200, a screw adapter 702 situated in the side region, the functioning of said screw adapter 702 corresponding to that of the screw adapter 202. The beam deflection module has an upper part 704 and a lower part 706, which each have in sectional view regions in the form of a right-angled triangle. In this case, the upper part 704 and the lower part 706 are connected by means of the corresponding hypotenuse sections, such that they form in their entirety a body that is rectangular in sectional view. In this case, a mirror can be mounted on the hypotenuse section of the upper part 704, by means of which mirror a laser processing beam coming from one side is deflected at right angles. However, it is also conceivable to mount a partly transmissive mirror, by means of which a laser processing beam coming from the underside of the beam deflection module 700 passes through the semi-transparent mirror to a top side and part of the laser processing beam is coupled out towards a side.

The length A of the processing laser beam passing through the beam deflection module 700 is once again coordinated with the raster dimension $L_1$, as shown in FIG. 1. In this case, it is particularly advantageous to choose for example double the raster dimension $L_1$, that is to say 50 mm, for example. Consequently, it is conceivable to insert a deflection module between the fibre holding module 104 and the collimator module 106 in the case of large focal lengths of the collimator lens 16a, 16b, 16c.

What can be achieved by means of the invention, therefore, as a result of the coordination of the passage length A of the employed optical modules with rastered focal lengths of the employed collimator lenses of a modular laser processing system, is that a compact construction is achieved by simple rearrangement of the mounting of individual functional modules 100. In this case, the functional modules 100 do not necessarily have to fulfill a function, but rather can also be used simply as spacer modules. Consequently, by way of example, the transition from a low to a high focal length of the collimator lens can be converted in a simple manner by inserting two spacer modules 100, only a small or no readjustment at all being necessary.

Therefore, besides the compact design of the modular laser processing system in the case of different collimator lens focal lengths, it is also possible to achieve rapid conversion of the modular laser processing system.

The invention claimed is:

1. A modular laser processing system for processing a workpiece by means of a processing laser beam, which system has a multiplicity of functional modules with a beam passage region which can be connected to one another in series along a processing laser beam path, comprising:
    a functional module embodied as a fibre connection module and serving for accommodating a fibre end from which the processing laser beam emerges, and
    a functional module embodied as a collimator module and having a collimator lens, which collimates the processing laser beam, wherein the collimator lens is selected from a group of collimator lenses having different focal lengths which correspond to a raster dimension or to an integer multiple thereof,
    wherein a length of the beam passage region of a functional module along the processing laser beam path corresponds to the raster dimension or to an integer multiple thereof,
    wherein the multiplicity of functional modules comprises a z adjustment module, which has a mount adjustable in the z direction and suitable for accommodating a fibre bush, a collimator lens or a focusing lens, and/or
    wherein the multiplicity of functional modules comprises an x or y adjustment module, by means of which functional modules arranged beam-upstream with respect to the adjustment module can be adjusted in an x or y direction relative to functional modules arranged beam-downstream with respect to the adjustment module.

2. The modular laser processing system according to claim 1, wherein the raster dimension lies in a range of between 20 mm and 35 mm.

3. The modular laser processing system according to claim 2, wherein the raster dimension is 25 mm.

4. The modular laser processing system according to claim 1, wherein the multiplicity of functional modules comprises a basic module having a mount suitable for accommodating a collimator lens, a focusing lens, a beam trap, a protective glass, an optical filter or an aperture diaphragm.

5. The modular laser processing system according to claim 1, wherein the x or y adjustment module has in its beam-entrance-side or beam-exit-side part a mount suitable for accommodating a fibre bush, a collimator lens or a focusing lens.

6. The modular laser processing system according to claim 1, wherein the multiplicity of functional modules comprises a gas feed module, which has a connection for a processing gas that can be supplied to the beam passage region of the gas feed module.

7. The modular laser processing system according to claim 1, wherein the multiplicity of functional modules comprises a cooling module, which has an annular channel surrounding the beam passage region of the cooling module and suitable for passing through a cooling liquid for cooling the cooling module.

8. The modular laser processing system according to claim 1, wherein the multiplicity of functional modules comprises a beam deflection module, which has a semitransparent deflection mirror for coupling out part of the processing laser beam or a specular deflection mirror for deflecting the processing laser beam.

9. The modular laser processing system according to claim 1, wherein the multiplicity of functional modules each have a screw adapter at their beam entrance side, by means of which screw adapter a functional module can be connected to a further functional module at the beam exit side thereof.

10. The modular laser processing system according to claim 1, wherein the multiplicity of functional modules each have, either at their beam entrance side or at their beam exit side, a sealing element surrounding an opening region of the beam passage region in order to form a gastight passage channel of the multiplicity of functional modules in the interconnected state.

11. A functional module with a beam passage region for a construction of a modular laser processing system for processing a workpiece by means of a processing laser beam by series connection to further multiplicity of functional modules which can be connected to one another in series along a processing laser beam path,
wherein the modular laser processing system comprises a functional module embodied as a fibre connection module and serving for accommodating a fibre end from which the processing laser beam emerges, and a functional module embodied as a collimator module and having a collimator lens, which collimates the processing laser beam,
and wherein the collimator lens is selected from a group of collimator lenses having different focal lengths which corresponds to a raster dimension or to an integer multiple thereof,
wherein a length of the beam passage region of the functional module along the processing laser beam path corresponds to the raster dimension or to an integer multiple thereof,
wherein the multiplicity of functional modules comprises a z adjustment module, which has a mount adjustable in the z direction and suitable for accommodating a fibre bush, a collimator lens or a focusing lens, and/or
wherein the multiplicity of functional modules comprises an x or y adjustment module, by means of which functional modules arranged beam-upstream with respect to the adjustment module can be adjusted in an x or y direction relative to functional modules arranged beam-downstream with respect to the adjustment module.

\* \* \* \* \*